United States Patent
Mitsui

(10) Patent No.: US 9,735,446 B2
(45) Date of Patent: Aug. 15, 2017

(54) BETA-ALUMINA-BASED SINTERED COMPACT AND ITS PRODUCTION METHOD

(71) Applicant: ASAHI GLASS COMPANY, LIMITED, Chiyoda-ku (JP)

(72) Inventor: Akira Mitsui, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 204 days.

(21) Appl. No.: 14/473,363

(22) Filed: Aug. 29, 2014

(65) Prior Publication Data

US 2014/0370397 A1 Dec. 18, 2014

Related U.S. Application Data

(63) Continuation of application No. PCT/JP2013/054225, filed on Feb. 20, 2013.

(30) Foreign Application Priority Data

Feb. 29, 2012 (JP) ................................. 2012-043515

(51) Int. Cl.
*H01B 1/08* (2006.01)
*C04B 35/00* (2006.01)
(Continued)

(52) U.S. Cl.
CPC ....... *H01M 10/0562* (2013.01); *C04B 35/113* (2013.01); *H01B 1/08* (2013.01); *H01M 10/0525* (2013.01); *C04B 2235/3203* (2013.01); *C04B 2235/3251* (2013.01); *C04B 2235/3255* (2013.01); *C04B 2235/3279* (2013.01); *C04B 2235/5427* (2013.01); *C04B 2235/5436* (2013.01); *C04B 2235/77* (2013.01);
(Continued)

(58) Field of Classification Search
CPC ....... H01B 13/00; C04B 35/113; H01M 10/39
See application file for complete search history.

(56) References Cited

U.S. PATENT DOCUMENTS 4,792,377 A * 12/1988 Dunn ........................ C30B 9/00
117/36
5,188,994 A 2/1993 Ichikawa et al.

FOREIGN PATENT DOCUMENTS

JP 51-27869 8/1976
JP 52-12395 4/1977
(Continued)

OTHER PUBLICATIONS

International Search Report issued May 21, 2014, in PCT/JP2013/054225 filed Feb. 20, 2013.

*Primary Examiner* — Mark Kopec
(74) *Attorney, Agent, or Firm* — Oblon, McClelland, Maier & Neustadt, L.L.P.

(57) ABSTRACT

To provide a dense beta-alumina-based sintered compact having a high ionic conductivity as a solid electrolyte by firing at a low temperature to suppress the volatilization of $Na_2O$ and its production method.
By adding $RNbO_3$ which is a material having a low melting point to a beta-alumina powder, followed by firing, it is possible to obtain a beta-alumina-based sintered compact having a low firing temperature and containing, as the main component, dense β" alumina crystals which are free from anomalous grain growth during the firing process.

16 Claims, 1 Drawing Sheet

(51) Int. Cl.
 *H01M 10/0562* (2010.01)
 *C04B 35/113* (2006.01)
 *H01M 10/0525* (2010.01)

(52) U.S. Cl.
 CPC ...... *C04B 2235/80* (2013.01); *C04B 2235/81* (2013.01); *H01M 2300/0071* (2013.01)

(56) References Cited

FOREIGN PATENT DOCUMENTS

| | | |
|---|---:|---:|
| JP | 2-229755 | 9/1990 |
| JP | 4-240155 | 8/1992 |
| JP | 4-285060 | 10/1992 |
| JP | 6-263526 | 9/1994 |
| JP | 7-65857 | 3/1995 |
| JP | 11-154414 | 6/1999 |
| JP | 11-246267 | 9/1999 |

\* cited by examiner

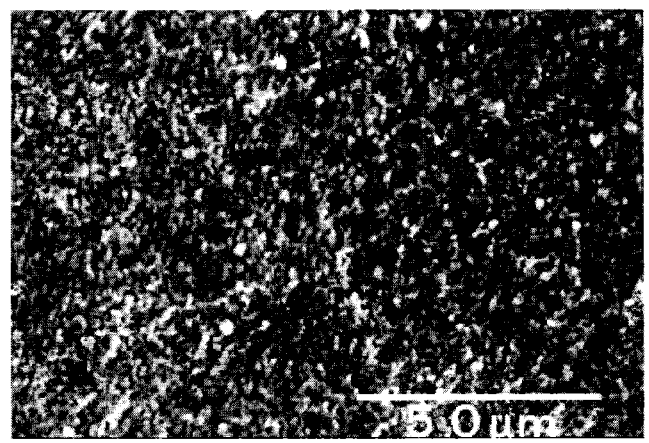

BETA-ALUMINA-BASED SINTERED COMPACT AND ITS PRODUCTION METHOD

This application is a continuation of PCT Application No. PCT/JP2013/054225 filed on Feb. 20, 2013, which is based upon and claims the benefit of priority from Japanese Patent Application No. 2012-043515 filed on Feb. 29, 2012. The contents of those applications are incorporated herein by reference in their entireties.

TECHNICAL FIELD

The present invention relates to a beta-alumina-based sintered compact which can be used as a solid electrolyte for a storage battery (secondary cell).

BACKGROUND ART

As a solid electrolyte for a storage battery such as a Na—S battery or a Na-molten salt battery, a beta-alumina-based sintered compact having a high sodium ion conductivity (hereinafter referred to simply as "ionic conductivity") has been used. The beta-alumina is classified into two types of crystalline form, namely β alumina of which the chemical composition is represented by $Na_2O\cdot xAl_2O_3$ (x=9 to 11) and β" alumina of which the chemical composition is represented by $Na_2O\cdot xAl_2O_3$ (x=5 to 7). Hereinafter, in the present specification, "beta-alumina" is used as a general term for β alumina and β" alumina. Among them, since β" alumina has a higher content of sodium ions in the crystalline structure and a relatively high ionic conductivity, β" alumina is used in applications for a solid electrolyte in many cases. On the other hand, it is known that since β" alumina is a metastable substance, its crystalline structure is hardly maintained.

Irrespective of its crystalline form, beta-alumina is hardly sinterable, and therefore, the firing temperature is required to be high at a level of at least 1,600° C. in order to obtain a dense sintered compact having a high density. Since the beta-alumina contains as the essential component, $Na_2O$ which easily volatilizes at a high temperature, it is desired to lower the firing temperature.

Heretofore, as a method to lower the firing temperature in firing beta-alumina, a liquid phase sintering has been proposed. In the liquid phase sintering, a sintering agent which becomes a liquid phase at a relatively low temperature is added to carry out firing. If the sintering agent is not properly selected, anomalous grain growth results among particles one another, and densification of a sintered compact is rather impaired, and the mechanical strength tends to deteriorate. Further, after firing, the sintering agent may sometimes remain in the sintered compact as a crystalline phase, whereby the durability, etc. of the sintered compact tend to be impaired.

Patent Document 1 proposes a process for obtaining a dense sintered compact, which comprises adding $Li_2O$ as a stabilizer for β" alumina in a weight ratio of from 0.5 to 0.75 wt % per the entire sintered compact, whereby the firing temperature in a liquid phase sintering can be lowered to 1,450° C. However, the sintered compact in which $Li_2O$ is used as a stabilizer is insufficient in durability, if used for a long period of time.

Patent Document 2 proposes a process which comprises adding $Bi_2O_3$, CuO or PbO as a sintering agent to lower the firing temperature of a beta-alumina to from 1,300 to 1,400° C., whereby the volatilization of $Na_2O$ can be suppressed. However, in such a process, the maximum relative density of the sintered compact is 94% at most, and it is not possible to obtain a dense sintered compact having a high mechanical strength.

PRIOR ART DOCUMENTS

Patent Documents

Patent Document 1: JP-A-7-65857
Patent Document 2: JP-A-2-229755

DISCLOSURE OF INVENTION

Technical Problem

It is an object of the present invention to provide a beta-alumina-based sintered compact which is dense, has a high ionic conductivity and is excellent in durability, by suppressing the volatilization of $Na_2O$ in the firing process, and its production method.

Solution to Problem

The present inventor has found that by adding as a sintering agent, $RNbO_3$ (R: at least one element selected from the group consisting of Li, Na and K) to a beta-alumina powder, the firing temperature for a beta-alumina-based sintered compact can be lowered, and it is possible to obtain a dense beta-alumina-based sintered compact having excellent mechanical strength and high ionic conductivity, which is preferred as a solid electrolyte. Further, he has found that by using the most suitable stabilizer in combination, the effect to suppress anomalous grain growth can be improved.

The present invention has the following constructions.

[1] A beta-alumina-based sintered compact which comprises $Na_2O$ and $Al_2O_3$ as the main components and has a beta-alumina-based crystalline phase and an $RNbO_3$ (R: at least one element selected from the group consisting of Li, Na and K) crystalline phase.

[2] The beta-alumina-based sintered compact according to the above [1], wherein the beta-alumina crystalline phase contains a β" alumina crystalline phase.

[3] The beta-alumina-based sintered compact according to the above [1] or [2], wherein R in $RNbO_3$ is Na.

[4] The beta-alumina-based sintered compact according to any one of the above [1] to [3], which contains nickel oxide (NiO).

[5] The beta-alumina-based sintered compact according to the above [4], wherein the chemical composition of the beta-alumina-based sintered compact comprises, based on oxides, from 8 to 15 mass % of $Na_2O$, from 5 to 30 mass % of $Nb_2O_5$, from 1 to 10 mass % of NiO and rest being $Al_2O_3$.

[6] A method for producing the beta-alumina-based sintered compact as defined in the above [1], which comprises mixing a beta-alumina powder and an $RNbO_3$ (R: at least one element selected from the group consisting of Li, Na and K) powder and molding and firing the mixture.

[7] The method for producing the beta-alumina-based sintered compact according to the above [6], wherein the firing temperature in the above firing is less than 1450° C.

[8] The method for producing the beta-alumina-based sintered compact according to the above [6] or [7], wherein the beta-alumina powder contains β" alumina.

[9] The method for producing the beta-alumina-based sintered compact according to any one of the above [6] to [8], wherein R in RNbO$_3$ is Na.

[10] The method for producing the beta-alumina-based sintered compact according to any one of the above [6] to [9], wherein the beta-alumina powder contains NiO.

[11] The method for producing the beta-alumina-based sintered compact according to the above [10], wherein the chemical composition of the beta-alumina-based sintered compact comprises, based on oxides, from 8 to 15 mass % of Na$_2$O, from 5 to 30 mass % of Nb$_2$O$_5$, from 1 to 10 mass % of NiO and rest being Al$_2$O$_3$.

Advantageous Effects of Invention

According to the method for producing a beta-alumina-based sintered compact of the present invention, the firing temperature is made to be lower than 1,450° C. Thus, it is possible to suppress the volatilization of Na$_2$O in the firing process. Further, since the volatilization of components can be suppressed, it is possible to carry out the firing by setting long heating-up time and long retention time to maintain uniform temperature in a furnace, whereby the quality stability of a product is excellent. Further, the anomalous grain growth in a sintered compact can be suppressed, whereby it is possible to obtain a beta-alumina-based sintered compact which is dense and has a high ionic conductivity. Such a sintered compact is suitable as a solid electrolyte for a storage battery (secondary cell).

BRIEF DESCRIPTION OF DRAWING

FIG. 1 is a SEM image in fracture cross-section of the sintered compact in Example 1.

DESCRIPTION OF EMBODIMENT

Now, an embodiment of the present invention will be described in detail.

The beta-alumina-based sintered compact of the present invention is a sintered compact having a beta-alumina crystalline phase, wherein an RNbO$_3$ crystalline phase and a beta-alumina crystalline phase are contained.

The RNbO$_3$ crystalline phase contained in the beta-alumina-based sintered compact of the present invention has a function as a binding reinforcement agent for grain boundary of beta-alumina particles, whereby the production of a solid electrolyte having a long life span and a high reliability, can be realized. An RNbO$_3$ powder to be a source of the RNbO$_3$ crystalline phase is a sintering agent having a low melting point, which becomes a liquid phase state at the time of firing and accelerates the sintering of beta-alumina. Spaces among the beta-alumina crystalline particles are filled with the RNbO$_3$ in the liquid phase state, which makes a sintered compact dense.

When the alkali metal element (R) in the RNbO$_3$, is Na element, the above function can be maximally obtained. Thus, it is preferred that an NaNbO$_3$ crystalline phase is present in the beta-alumina-based sintered compact, or it is preferred to use an NaNbO$_3$ powder as a sintering agent.

In the beta-alumina-based sintered compact of the present invention, the beta-alumina crystalline phase may contain a small amount of a β alumina crystalline phase, however, it is preferred that the beta-alumina crystalline phase consists mostly of a β" alumina crystalline phase from the viewpoint of the ionic conductivity. In order to improve the ionic conductivity, it is more preferred for that the beta-alumina crystalline phase consists solely of a β" alumina crystalline phase.

The beta-alumina-based sintered compact of the present invention preferably contains a stabilizer for stably maintaining the β" alumina crystalline structure. It is preferred that the stabilizer has not only an effect to stabilize the crystalline structure but also an effect to prevent the anomalous grain growth during the firing process, particularly the process in which a liquid phase exists.

As the stabilizer, NiO is preferred, since not only the β" alumina crystalline structure can be maintained, but also the anomalous grain growth can be prevented during firing, and the sintered compact is made to be dense. Further, it is more preferred that NiO is contained in the beta-alumina crystalline phase in the sintered compact, and it is further preferred that NiO is contained in the β" alumina crystalline structure.

Further, the presence of the crystalline phase can be confirmed by the identification by means of an X-ray diffraction apparatus.

It is preferred that the chemical composition of the beta-alumina-based sintered compact of the present invention comprises, based on oxides, from 8 to 15 mass % of Na$_2$O, from 5 to 30 mass % of Nb$_2$O$_5$ and the rest being Al$_2$O$_3$.

Further, it is more preferred that the beta-alumina-based sintered compact of the present invention contains NiO as a stabilizer, and the chemical composition comprises, based on oxides, from 8 to 15 mass % of Na$_2$O, from 5 to 30 mass % of Nb$_2$O$_5$, from 1 to 10 mass % of NiO and the rest being Al$_2$O$_3$.

Now, the reasons why respective chemical components are limited to the above ranges will be described.

Sodium oxide (Na$_2$O) is an essential component to form a beta-alumina phase. The content is preferably from 8 to 15 mass %. If the content is less than 8 mass %, the beta-alumina phase cannot be sufficiently formed, and if the content exceeds 15 mass %, excess sodium aluminate remains in the crystalline phase, and thereby the ionic conductivity deteriorates. The content is more preferably from 9 to 14 mass %, further preferably from 10 to 13 mass %.

Niobium oxide (Nb$_2$O$_5$) is a material for the RNbO$_3$ phase. The content is preferably from 5 to 30 mass %. If the content is less than 5 mass %, a dense sintered compact cannot be obtained. Further, if the content exceeds 30 mass %, the ionic conductivity deteriorates. So as to be dense and improve the ionic conductivity, the content is more preferably from 6.5 to 28 mass %, further preferably from 8 to 25 mass %.

Nickel oxide (NiO) is a stabilizer for the β" alumina crystalline structure. The content is preferably from 1 to 10 mass %. If the content is less than 1 mass % or exceeds 10 mass %, the β" alumina crystalline structure tends to be unstable. Further, at the time of firing, it causes the anomalous grain growth, and thereby, a dense sintered compact having a high ionic conductivity cannot be obtained. Thus, the content is more preferably from 3 to 6.5 mass %, further preferably from 4.5 to 5.5 mass %.

Aluminum oxide (Al$_2$O$_3$) is an essential component to form the beta-alumina phase. The content is controlled so that the total amount with other components would be 100 mass %.

The chemical composition can be quantitatively measured by means of a fluorescent X-ray analysis.

Further, the beta-alumina-based sintered compact of the present invention preferably has a relative density of at least 97% and an open porosity of at most 0.5 vol % so as to attain densification. The open porosity is more preferably at most 0.3 vol %. When the relative density is high, particularly when the open porosity is low, the ionic conductivity and the mechanical strength are improved, and as a solid electrolyte, more preferred one can be obtained. The relative density and the open porosity can be measured by means of the Archimedes method.

Now, the method for producing the beta-alumina-based sintered compact in the embodiment of the present invention will be explained. Here, $NaNbO_3$ is used as a kind of $RNbO_3$, and NiO is used as a stabilizer, however, the present invention is not restricted thereto.

The beta-alumina-based sintered compact in the embodiment is produced by mixing a beta-alumina powder and an $NaNbO_3$ powder, and molding and firing the mixture.

The beta-alumina powder is produced as follows. A sodium carbonate ($Na_2CO_3$) powder, an alumina ($Al_2O_3$) powder and a nickel oxide (NiO) powder are prepared. These material powders are weighed so as to be in the predetermined proportions such that $Na_2CO_3$ would be from 15 to 17 mass % of the total mass of $Na_2CO_3$, $Al_2O_3$ and NiO ($Na_2CO_3+Al_2O_3+NiO$), $Al_2O_3$ would be from 78 to 80 mass %, and NiO would be from 5 to 7 mass %. These powders are mixed by using a ball mill or the like to obtain a mixed powder. Here, material powders to be used are not particularly restricted, so long as a sintered compact has a beta-alumina crystalline phase.

The mixed powder is put in a heat resistant container such as an alumina crucible and calcinated at from 1,000 to 1,300° C. in air to synthesize a beta-alumina powder containing NiO as a stabilizer. Here, the retention time is preferably, for example, from 1 to 10 hours. Further, $CO_2$ component in sodium carbonate evaporates in the calcination.

On the other hand, the $NaNbO_3$ powder is produced as follows. A sodium carbonate ($Na_2CO_3$) powder and a niobium oxide ($Nb_2O_5$) powder are prepared. These material powders are weighed so as to be in the predetermined proportions such that $Na_2CO_3$ would be from 28 to 29 mass % of the total mass of $Na_2CO_3$ and $Nb_2O_5$ ($Na_2CO_3+Nb_2O_5$), and $Nb_2O_5$ would be from 71 to 72 mass %, followed by mixing by a ball mil or the like to obtain a mixed powder. Here, material powders to be used are not particularly restricted, so long as they will form the chemical composition of $NaNbO_3$ in the following calcination step.

The obtained mixed powder is put in a heat resistant container such as an alumina crucible and calcinated at from 800 to 1,000° C. in air to synthesize an $NaNbO_3$ powder. Here, the retention time is preferably from about 1 to 10 hours. Further, $CO_2$ component in sodium carbonate evaporates in the calcination.

The beta-alumina powder and the $NaNbO_3$ powder thus produced are weighed so as to be in the predetermined proportions such that the beta-alumina powder would be from 50 to 93 mass % of the total mass of the beta-alumina powder and the $NaNbO_3$ powder, and the $NaNbO_3$ powder would be from 7 to 50 mass %. Here, if the $NaNbO_3$ is less than 7 mass %, a dense sintered compact cannot be obtained. Further, if $NaNbO_3$ exceeds 50 mass %, the ionic conductivity of the sintered compact deteriorates. It is preferred that the content of the beta-alumina powder is from 70 to 88 mass %, and the content of $NaNbO_3$ is from 12 to 30 mass % from the viewpoint of densification and high ionic conductivity. It is further preferred that the content of beta-alumina powder is from 78 to 86 mass %, and the content of $NaNbO_3$ is from 14 to 22 mass %.

After weighing, the powders are mixed and pulverized by a wet method until the average particle size becomes at most 10 μm, preferably at most 2 μm, followed by drying to obtain a mixed powder. By making the average particle size of the powder small, a dense sintered compact can be produced. In the present specification, the average particle size is a value measured by means of a laser diffraction method. Further, the pulverization method is not particularly restricted, and for example, pulverization can be carried out by a ball mill, an attritor, a beads mill or a jet mill.

Further, a mixed powder of the beta-alumina powder and the $NaNbO_3$ powder can be simultaneously produced as described below without separately producing a beta-alumina powder and an $NaNbO_3$ powder and mixing them. First, a sodium carbonate ($Na_2CO_3$) powder, an alumina ($Al_2O_3$) powder, a nickel oxide (NiO) powder and a niobium oxide ($Nb_2O_5$) powder are prepared. These material powders are weighed so as to be in the predetermined proportions such that $Na_2CO_3$ would be from 16 to 25 mass % of the total mass of $Na_2CO_3$, $Al_2O_3$, NiO and $Nb_2O_5$ ($Na_2CO_3+Al_2O_3+NiO+Nb_2O_5$), NiO would be from 3 to 6 mass %, $Nb_2O_5$ would be from 7 to 35 mass % and the rest would be $Al_2O_3$, followed by mixing by a ball mill or the like to obtain a mixed powder.

The mixed powder is put in a heat resistant container such as an alumina crucible and calcinated at from 1,000 to 1,300° C. in air to synthesize a mixed powder of the beta-alumina powder and the $NaNbO_3$ powder. Here, the retention time is preferably, for example, from 1 to 10 hours. Further, when the calcination temperature is at least 1,000° C., the reaction sufficiently proceeds, and the density of a sintered compact using this powder is made to be sufficiently high. Further, when the calcination temperature is at most 1,300° C., the hardness of the powder is suitable, whereby time for pulverization can be preferably reduced. The calcination temperature is more preferably from 1,000 to 1,200° C., and in such a case, the reaction sufficiently proceeds, whereby an excellent mixed powder of which pulverization time is relatively short can be obtained. As described above, the obtained mixed powder is pulverized by a wet method until the particle size becomes at most 10 μm, preferably at most 2 μm, followed by drying to obtain a mixed powder.

The mixed powder of the beta-alumina powder and the $NaNbO_3$ powder thus obtained is formed into a predetermined shape to obtain a molded product. The molding method is not particularly restricted, and a conventional molding method may be used. For example, molding can be carried out by hydrostatic press by applying a pressure of from 100 to 200 MPa. Otherwise, a mixture formed by adding an organic binder to the mixed powder may be kneaded and formed into a predetermined shape by a press molding, an extrusion molding, a sheet forming or the like. The shape obtained by the molding is not particularly restricted, and depending on applications, it may be formed into various shapes.

The molded product is fired in air at a temperature of less than 1,450° C. for from 1 to 12 hours. If the firing temperature is too low, the effect of the liquid phase sintering by molten $NaNbO_3$ is insufficient, and a dense sintered compact cannot be obtained. On the other hand, if the firing temperature is too high, $Na_2O$ volatilizes, such being undesirable. Thus, the firing temperature is preferably at least 1,350° C. and less than 1,450° C., more preferably from 1,375 to 1,425° C.

The retention time at the highest temperature is not particularly restricted, and for example, it is from 1 to 12 hours, preferably from 2 to 5 hours. The firing atmosphere is not particularly restricted, for example, the air atmosphere, oxygen atmosphere, inert atmosphere such as nitrogen atmosphere or argon atmosphere or reductive atmosphere such as hydrogen or mixed atmosphere of hydrogen and nitrogen may be selected. Among them, the air atmosphere is preferred, since a relatively simple electric furnace may be used.

EXAMPLES

Now, Examples of the present invention will be described. However, it should be understood that the present invention is by no means restricted to the following Examples. Ex. 1 to 4 are Working Examples of the present invention, and Ex. 5 and 6 are Comparative Examples.

<Production of Sintered Compact>

In Ex. 1 to 4, a sodium carbonate ($Na_2CO_3$) powder (manufactured by Kanto Chemical Co., Inc., guaranteed reagent), an α-alumina ($Al_2O_3$) powder (manufactured by Sumitomo Chemical Co., Ltd., tradename: AKP50) and a nickel oxide (NiO) powder (manufactured by Koujundo Chemical Lab. Co., Ltd., 3N product) were weighed in proportions of 15.4 mass %, 78.9 mass % and 5.7 mass % respectively. They were mixed by a dry ball mill for 24 hours.

The obtained mixed powder was put in an alumina crucible and calcinated at 1,250° C. for 5 hours in air to synthesize a beta-alumina powder containing NiO as a stabilizer. The calcinated powder cooled to room temperature was made the agglomeration broken by passing it through a mesh having openings of 850 μm to regulate the particle size.

On the other hand, a sodium carbonate ($Na_2CO_3$) powder and a niobium oxide ($Nb_2O_5$) powder (manufactured by Koujundo Chemical Lab. Co., Ltd., 3N/1 micrometer product) were weighed in proportions of 28.5 mass % and 71.5 mass % respectively and mixed by a dry ball mill for 24 hours.

The obtained mixed powder was put in an alumina crucible and calcinated in air at 950° C. for 5 hours to synthesize an $NaNbO_3$ powder. The calcinated powder cooled to room temperature was made the agglomeration broken by passing it through a mesh having openings of 850 μm to regulate the particle size.

The obtained beta-alumina powder and $NaNbO_3$ powder were weighed to constitute the composition of the mixed powder shown in Table 1, followed by mixing and pulverization by a wet ball mill for 96 hours by using ethanol as a dispersant and a yttria stabilized ball made of zirconia (manufactured by Nikkato Corporation, tradename: YTZ ball). Then, the slurry was dried, to obtain a mixed powder in each of Ex. 1 to 4.

In Ex. 5, a beta-alumina powder was synthesized and made the agglomeration broken in the same manner as in Ex. 1 to 4 to obtain a beta-alumina powder.

Then, the mixed powders of Ex. 1 to 4 and the beta-alumina powder of Ex. 5 were respectively molded by means of a hydrostatic press at room temperature at 180 MPa and then fired by heating at 1,400° C. for 2 hours in air.

In Ex. 6, a sodium carbonate ($Na_2CO_3$) powder, an α-alumina ($Al_2O_3$) powder and a lithium carbonate ($Li_2CO_3$) powder (manufactured by Junsei Chemical Co., Ltd., guaranteed reagent) were used as the material powder, its composition would be 14.1 mass %, 84.2 mass % and 1.7 mass % respectively. The mixed powder was fired in the same manner as in Ex. 5. Here, the firing temperature was controlled at 1,500° C.

In Ex. 1 to 5, the chemical composition of the obtained sintered compact was analyzed by using a fluorescent X-ray analysis apparatus (manufactured by Rigaku Corporation, apparatus name: RIX3000). In Table 1, the mixing ratio of the beta-alumina and the $NaNbO_3$ powder and the chemical composition of the sintered compact obtained from results of the chemical composition analysis of the sintered compact by the fluorescent X-ray analysis are shown. The results of the fluorescent X-ray analysis are the proportions (mass %) of respective components, when the total mass of $Na_2O$, $Al_2O_3$, $Nb_2O_5$ and NiO is 100 mass %. Further, in the obtained sintered compact, the total content of materials other than $Na_2O$, $Al_2O_3$, $Nb_2O_5$ and NiO was less than 1 mass %, per the total sintered compact.

TABLE 1

| | Contents of powder (mass %) | | Composition of sintered compact (mass %) | | | |
|---|---|---|---|---|---|---|
| Ex. | Beta-alumina | $NaNbO_3$ | $Na_2O$ | $Al_2O_3$ | $Nb_2O_5$ | NiO |
| 1 | 90 | 10 | 10.6 | 75.8 | 8.1 | 5.5 |
| 2 | 85 | 15 | 11.0 | 71.6 | 12.2 | 5.2 |
| 3 | 80 | 20 | 11.5 | 67.4 | 16.2 | 4.9 |
| 4 | 75 | 25 | 11.9 | 63.2 | 20.3 | 4.6 |
| 5 | 100 | 0 | 9.6 | 84.3 | 0 | 6.1 |

The crystal phase construction and properties (relative density, opening porosity, conductivity and appearance after left in air for 30 days) of the sintered compacts obtained in Ex. 1 to 6 were measured as follows. Results are shown in Table 2.

<Measurement and Evaluation Methods of Physical Properties, Etc.>

(a) Crystalline Phase

The crystalline phase was identified by an X-ray diffraction apparatus (manufactured by Rigaku Corporation, apparatus name: RINT2000).

(b) Relative Density and Opening Porosity

The bulk density and the opening porosity of the sintered compact were measured by an Archimedes method defined by JIS R1634. The ratio to the theoretical density of the bulk density is the relative density. In Ex. 1 to 5, the theoretical density of beta-alumina is 3.36 g/cm³, that of $NaNbO_3$ is 4.44 g/cm³, and the theoretical density in Ex. 1 to 5 was calculated based on the proportion in each content of powder shown in Table 1. In Ex. 6, a value of 3.21 g/cm³ was used as the theoretical density.

(c) Conductivity

As the ionic conductivity of the sintered compact, the conductivity was measured by means of a complex impedance plot method at 25° C. and at 110° C.

(d) Appearance After Left in Air for 30 Days

The appearance of the obtained sintered compact before and after left in air for 30 days was observed.

TABLE 2

| Ex. | Crystalline phase | Relative density (%) | Opening porosity (vol %) | Conductivity (S/cm) 25° C. | Conductivity (S/cm) 110° C. | Outer appearance after left in air for 30 days |
|---|---|---|---|---|---|---|
| 1 | β"-alumina, NaNbO$_3$ | 97.0 | 0.29 | 0.001 | 0.01 | Not changed |
| 2 | β"-alumina, NaNbO$_3$ | 99.2 | Less than 0.01 | 0.003 | 0.03 | Not changed |
| 3 | β"-alumina, NaNbO$_3$ | 99.7 | Less than 0.01 | 0.003 | 0.03 | Not changed |
| 4 | β"-alumina, NaNbO$_3$ | 99.6 | 0.02 | 0.002 | 0.02 | Not changed |
| 5 | β"-alumina | 60.4 | 38.9 | Not measured due to breakage/cracks | | Breakage/cracks observed |
| 6 | β"-alumina, β-alumina | 98.7 | 1.1 | $2 \times 10^{-6}$ | $4 \times 10^{-6}$ | Breakage/cracks observed |

INDUSTRIAL APPLICABILITY

According to the present invention, a beta-alumina-based sintered compact which is dense and has a high ionic conductivity can be stably produced. Further, by using such a beta-alumina-based sintered compact as a solid electrolyte for a storage battery, a storage battery which has a long life span and a high reliability can be produced.

Even though as a conductive element, $Na^+$ is replaced by another alkali metal ion such as $Li^+$, a beta-alumina-based sintered compact which is dense and has a high ionic conductivity can be similarly produced. In such a case, the beta-alumina-based sintered compact can be used as a solid electrolyte for an all solid state lithium ion cell.

What is claimed is:

1. A beta-alumina-based sintered compact, comprising:
   a beta-alumina crystalline phase having $Na_2O$ and $Al_2O_3$ as main components; and
   an $RNbO_3$ crystalline phase;
   wherein R is at least one element selected from the group consisting of Li, Na, and K.

2. The beta-alumina-based sintered compact according to claim 1, wherein the beta-alumina crystalline phase comprises a β" alumina crystalline phase.

3. The beta-alumina-based sintered compact according to claim 1, wherein R is Na.

4. The beta-alumina-based sintered compact according to claim 1, comprising NiO as a component.

5. The beta-alumina-based sintered compact according to claim 4, wherein a chemical composition of the beta-alumina-based sintered compact, based on oxides, is:
   from 8 to 15 mass % of $Na_2O$;
   from 5 to 30 mass % of $Nb_2O_5$;
   from 1 to 10 mass % of NiO; and
   a remainder of $Al_2O_3$.

6. A method for producing the beta-alumina-based sintered compact as defined in claim 1, comprising:
   mixing a beta-alumina powder and an $RNbO_3$ powder; and
   molding and firing the mixture;
   wherein R is at least one element selected from the group consisting of Li, Na, and K.

7. The method for producing the beta-alumina-based sintered compact according to claim 6, wherein firing the mixture comprises firing at a temperature of less than 1450° C.

8. The method for producing the beta-alumina-based sintered compact according to claim 6, wherein the beta-alumina powder comprises β" alumina.

9. The method for producing the beta-alumina-based sintered compact according to claim 6, wherein R is Na.

10. The method for producing the beta-alumina-based sintered compact according to claim 6, wherein the beta-alumina powder comprises NiO.

11. The method for producing the beta-alumina-based sintered compact according to claim 10, wherein a chemical composition of the beta-alumina-based sintered compact, based on oxides, is
   from 8 to 15 mass % of $Na_2O$;
   from 5 to 30 mass % of $Nb_2O_5$;
   from 1 to 10 mass % of NiO; and
   a remainder of $Al_2O_3$.

12. A beta-alumina-based sintered compact, comprising:
   as chemical components, based on oxides, $Na_2O$ and $Al_2O_3$; and
   as a crystalline phase, a beta alumina crystalline phase and an $RNbO_3$ crystalline phase;
   wherein R is at least one element selected from the group consisting of Li, Na, and K.

13. The beta-alumina-based sintered compact according to claim 12, wherein the beta-alumina crystalline phase comprises a β" alumina crystalline phase.

14. The beta-alumina-based sintered compact according to claim 12, wherein R is Na.

15. The beta-alumina-based sintered compact according to claim 12, comprising NiO.

16. The beta-alumina-based sintered compact according to claim 15, wherein a chemical composition of the beta-alumina-based sintered compact, based on oxides, is:
   from 8 to 15 mass % of $Na_2O$,
   from 5 to 30 mass % of $Nb_2O_5$;
   from 1 to 10 mass % of NiO; and
   a remainder of $Al_2O_3$.

* * * * *